United States Patent [19]

O'Grady

[11] Patent Number: 5,369,876

[45] Date of Patent: Dec. 6, 1994

[54] APPARATUS FOR INSERTING U-SHAPED TUBES IN A HEAT EXCHANGER CORE

[75] Inventor: Derek O'Grady, Stanford-Le-Hope, United Kingdom

[73] Assignee: Ford Motor Company, Dearborn, Mich.

[21] Appl. No.: 142,433

[22] PCT Filed: Apr. 23, 1992

[86] PCT No.: PCT/GB92/00743
§ 371 Date: Nov. 22, 1993
§ 102(e) Date: Nov. 22, 1993

[87] PCT Pub. No.: WO93/00198
PCT Pub. Date: Jan. 7, 1993

[30] Foreign Application Priority Data

Jun. 26, 1991 [GB] United Kingdom ............ 9113950.1

[51] Int. Cl.$^5$ .............................................. B23P 15/00
[52] U.S. Cl. ............................................ 29/726; 29/727; 29/723; 29/890.047
[58] Field of Search ............... 29/726, 727, 726.5, 29/723, 33 G, 890.047

[56] References Cited

U.S. PATENT DOCUMENTS

| 4,202,085 | 5/1980 | Vollmer | 29/726 |
| 4,221,534 | 9/1980 | Rethy | 29/726 |
| 4,380,868 | 4/1983 | Hall | 29/726 |
| 4,698,904 | 10/1987 | Nozawa et al. | 29/33 G |
| 4,734,969 | 4/1988 | Currie et al. | 29/726 |
| 5,003,691 | 4/1991 | Millinan et al. | 29/727 |
| 5,220,722 | 6/1993 | Millinan | 29/726 |

FOREIGN PATENT DOCUMENTS 0126457 11/1984 European Pat. Off. .
2157985 11/1987 United Kingdom .

*Primary Examiner*—Irene Cuda
*Attorney, Agent, or Firm*—Raymond L. Coppiellie; Roger L. May

[57] ABSTRACT

An apparatus for inserting U shaped tubes in a heat exchange core includes a track which includes a pair of parallel channels for receiving the limbs of the tubes and for guiding the limbs on three sides, a slide for pushing the tubes along the track and into the heat exchange core, and restraining means for closing the fourth side of the channels to guide the limbs, the restraining means being adapted to move out of the track as the head of the tube and the slide pass along the track.

11 Claims, 3 Drawing Sheets

APPARATUS FOR INSERTING U-SHAPED TUBES IN A HEAT EXCHANGER CORE

FIELD OF THE INVENTION

This invention relates to apparatus for and to a method of inserting U-shaped heat exchanger tubes in a heat exchange core.

U-shaped heat exchanger tubes are often referred to as hairpin tubes. These tubes are used to conduct a liquid medium through a heat exchanger and are used where the heat exchanger has a manifold on one end only. The liquid flows along one limb of the U-shaped tube to the far end of the heat exchanger core, and then flows back through the other limb to the manifold. The manifold may be divided into a number of different sections.

The invention is particularly, but not exclusively, applicable to heat exchanger cores as used in motor vehicles. In many such heat exchangers, the core is formed by a stack of thin fins which have holes pierced in them through which tubes can pass. The tubes have to be inserted through the holes in each fin in order to assemble the heat exchanger. In a subsequent manufacturing stage (which is no concern of the present invention) the tubes are expanded outwardly into intimate, thermally conducting, contact with the fins.

BACKGROUND TO THE INVENTION

Heat exchangers are known where straight heat exchanger tubes are used and it is known to insert such tubes automatically.

British patent specification 2 157 985 shows a system for threading U-shaped tubes into a heat exchanger core, but this requires the use of lacing rods which are introduced from below through the holes in the core, and which guide the leading ends of the U-shaped tubes. This is shown in FIGS. 10, 11, 12 and 13 of British patent specification 2 157 985.

European patent specification 0 126 457 also describes a system for inserting U-shaped tubes into a heat exchanger, but in this case the tubes are moved horizontally into holes in the heat exchanger, and are merely supported from below during the insertion process.

SUMMARY OF THE INVENTION

According to the present invention, there is provided apparatus for inserting U-shaped heat exchanger tubes in a heat exchanger core, the apparatus comprising a track which includes a pair of parallel channels for receiving the limbs of the tubes and for guiding the limbs on three sides of a slide for pushing the tubes along the track and into a heat exchanger core, and restraining means for closing the fourth side of the channels to guide the limbs, the restraining means being adapted to move out of the track as the head of the tube and the slide pass along the track.

The restraining means preferably comprises at least one tongue which can be inserted into the track, between the channels, to locally close the fourth side of the channels. For example, if the U-shaped tubes are 750 mm long, there may be three tongues forming the restraining means.

It is preferred if each tongue only moves out of the track at the last minute before the head of the tube and the slide reach the location of the tongue. The tongues will therefore move out of the track sequentially as the tube moves along the track.

It is also preferred if the restraining means are moved out of the track by a component which moves with the slide. This ensures that correct sequencing is achieved.

The tongues may comprise a leading end part which is introduced into the track, and a rear end part which is engaged by a retractor mechanism. The tongue is preferably biased into its position in the track and is moved out of the track, against the biasing force, by the retractor mechanism. The retractor mechanism may be a rod connected to the top of the slide which makes contact with each tongue a short distance ahead of the position of the slide, to withdraw each tongue from the track.

The apparatus preferably also includes a magazine in which tubes are collected, with the surfaces of the next tube to be inserted forming one wall of the channel and acting as a guide on one side of the channel for guiding the limbs of a tube which is being inserted, and means for feeding the next tube into the track as soon as a preceding tube has been pushed out of the track.

The apparatus may also include means for supporting a heat exchanger core in a fixed position relative to the track, and means for indexing the core and the track relative to one another so that the tubes can be inserted at different positions along the length of the core. In a development of the invention, the apparatus may include several tracks all of which can insert tubes simultaneously into the same heat exchanger core.

BRIEF DESCRIPTION OF THE DRAWINGS

The invention will now be further described, by way of example, with reference to the accompanying drawings, in which.

DESCRIPTION OF A PREFERRED EMBODIMENT

Figure 1:
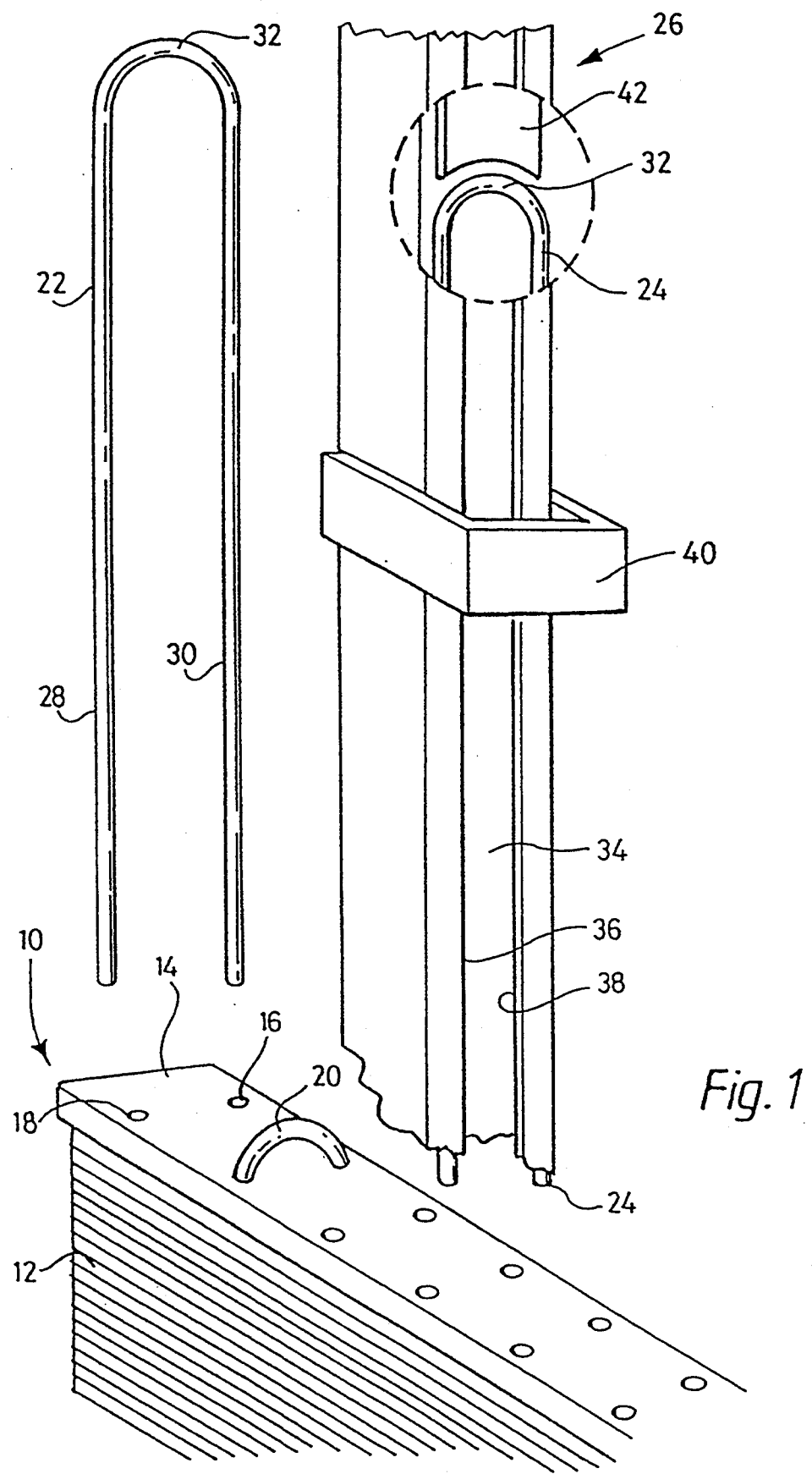
FIG. 1 is a perspective view of apparatus for inserting heat exchanger tubes in a heat exchanger core, in accordance with the invention.

FIG. 1 shows a heat exchanger core 10 made up from a large number of stacked fins 12. At the top of the stack of fins is a header plate 14 with holes 16, 18. Each of the fins 12 also has holes 16, 18 and a heat exchanger tube 20 has to be passed through all of these holes. FIG. 1 shows one heat exchanger tube 20 which has been fully inserted in the core 10; one heat exchanger tube 22 shown independently of the core and one heat exchanger tube 24 loaded in a tube insertion head 26 of the apparatus.

As can be seen in FIG. 1, each heat exchanger 22 has parallel limbs 28, 30 joined by a head 32 which is part circular. The tubes are hollow such that a continuous fluid path exists from the bottom end of the limb 28, via the head 32 and through to the bottom end of the limb 30. Typically the length of the limbs 28, 30 can be between 500 mm and 750 mm with the tube outside diameter being about 6 mm and the tube wall thickness being of the order of 0.5 mm.

One heat exchanger tube 20, 22, 24 is inserted in each pair of holes 16, 18 by means of the insertion head 26.

The insertion head 26 has a front face 34, and two parallel channels 36, 38 in which the limbs 28, 30 of the tubes can be guided.

Figure 2:
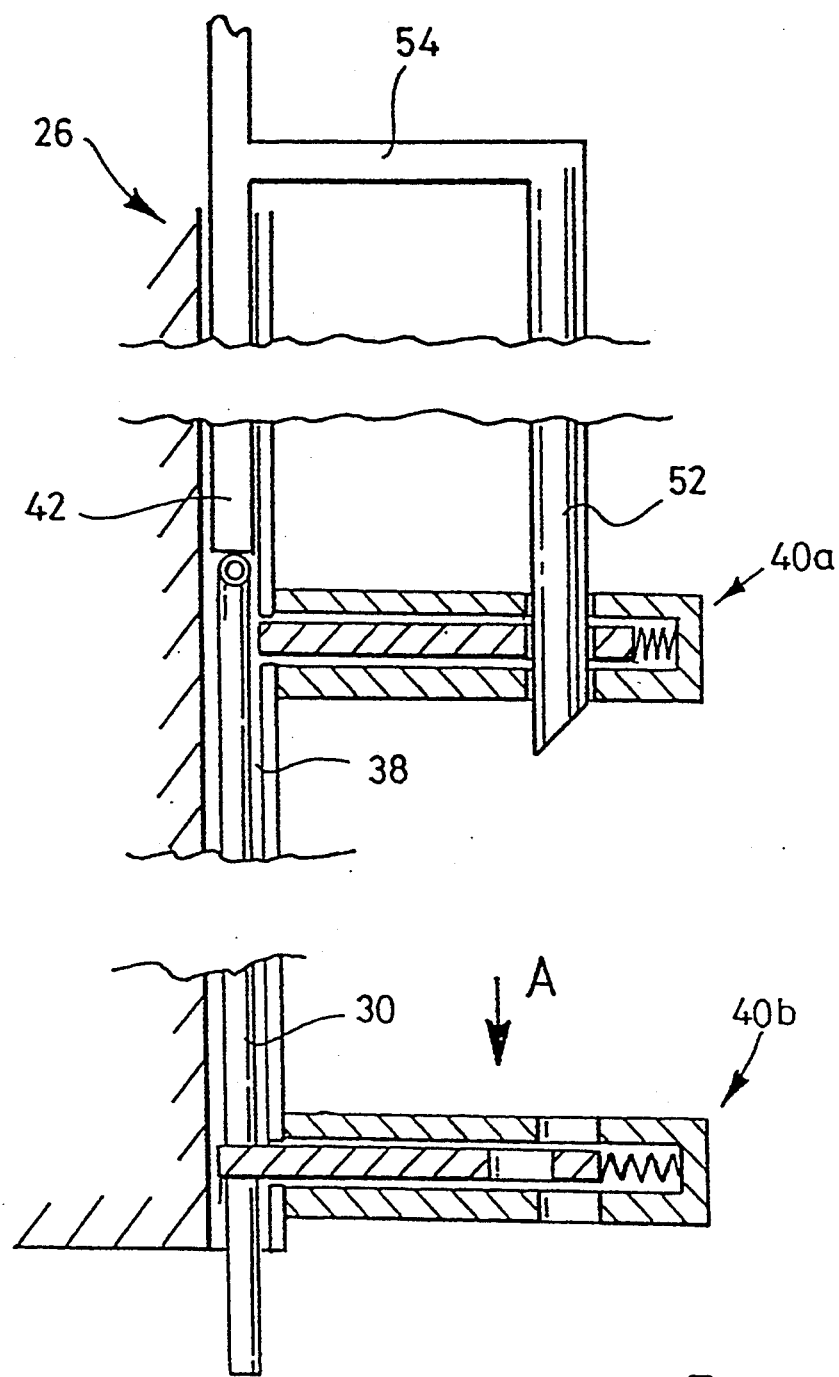
FIG. 2 is a vertical cross section through the apparatus shown in FIG. 1.

Along the length of the insertion head 26, there are a number of tube restraining units 40. One of these is shown in FIG. 1; two are shown in FIG. 2 at 40a and 40b, and one is shown again in FIG. 3. The actual number of restraining units 40 required will depend upon the length of the limbs 28, 30 but there is likely to be a minimum of two such restraining units, with one positioned at or very close to the bottom of the insertion unit 26.

In use, the insertion unit 26 is positioned above the heat exchanger core 10, and either the core 10 or the unit 26, or both, may be moved to achieve correct alignment with the holes 16, 18. A tube 24 is loaded into the front end of the insertion unit. The tube may be loaded from a magazine containing a large number of such tubes and located behind the insertion unit, but this magazine is not shown and forms no part of the present invention.

Above the head 32 of the tube there is a slice 42, the lower end of which has a shape conforming to the arcuate shape of the head 32. A drive mechanism (not shown) is provided to drive the slide 42 downwards and thereby to push the tube 24 out of the bottom end of the insertion unit and into the holes 16, 18.

Over the greater part of its length, the tube 24 is supported in the channels 36, 38 on three sides only. The sides of these channels which face each other are open. However because it may be necessary to apply a considerable force by way of the slide 42 to push the limbs 28, 30 of the tube 24 into the holes in the core, it is desirable to provide some support on the open side of the channels to prevent the tubes bowing. This support is provided by restraining units 40, one of which is shown in its active position in FIG. 3. The restraining unit 40b shown in FIG. 3 has a frame 44 mounted on the insertion unit 26, and a moveable tongue 46 mounted in the frame 44 for movement in the directions indicated by a double-headed arrow 48. The tongue is normally biased by springs 50 into the position shown in FIG. 3 where it projects into the space between the channels 36, 38 and locally closes the fourth side of these channels. The limbs 28, 30 of the tubes are then constrained on all four sides as they are guided into the core.

Because the limbs 28, 30 are linked together an their top ends by the head 32, the head 32 itself has to pass each restraining unit 40 during each insertion process. It is therefore necessary for each tongue 46 to be withdrawn sequentially during the insertion process. This withdrawal is performed by a probe 52 which is linked by a cross beam 54 to the slide 42, and moves with the slide 42. As can be seen in FIG. 2, the bottom end of the probe 52 is sightly ahead of the bottom end of the slide 42.

Figure 3:
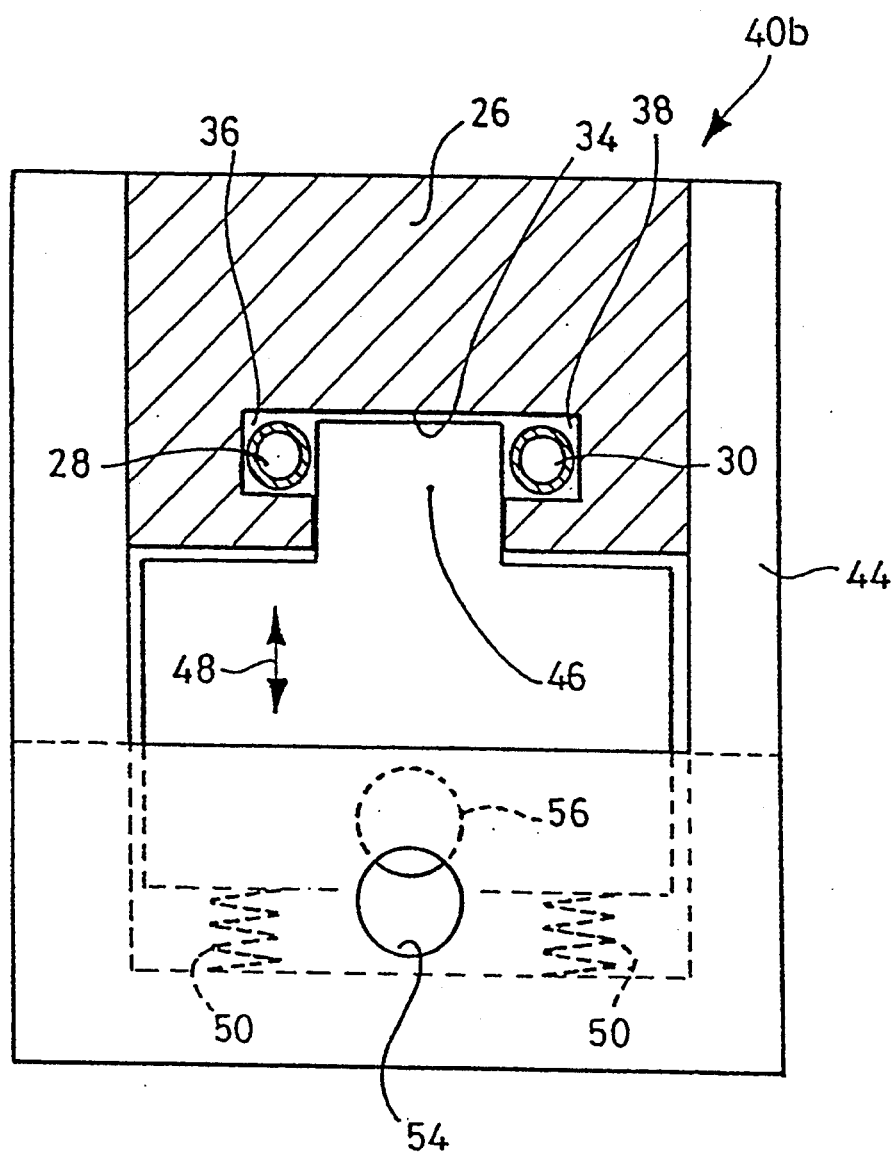
FIG. 3 is a view taken in the direction of the arrow A from FIG. 2.

FIG. 3 shows that the frame 44 of each restraining unit has a through hole 54. This hole is of the correct size to accept the probe 52. Each tongue 46 also has a corresponding hole 56, but this hole is located in the position shown both in FIG. 3 and in the lower half of FIG. 2. In the lower half of FIG. 2, the hole 56 is out of register with the hole 54. When the, chamfered leading end of the probe 52 enters the hole 54, it will also enter the exposed part of the hole 56 and as the probe continues to move downwards, it will cause the tongue 46 to be drawn back as seen in the upper half of FIG. 2. The head 32 of the tube can then pass, together with the slide 42.

In the lower restraining unit 40b shown in FIG. 2, the tongue 46 will remain in its extended position until the leading end of the probe 52 reaches that unit, shortly before the head 32 of the tube requires to pass that unit. The tube 24 can therefore be pushed fully home into the core 12, with the limbs being restrained on all four sides substantially throughout the insertion process.

The invention has been illustrated here in schematic form. The skilled man will appreciate that a number of variations and modifications can be made without affecting the inventive principle as described here. In particular some form of roller or sliding bearing may be provided around perimeter of the hole 56 in the tongue 46 to facilitate the action of the probe 52 in retracting the tongue. Arrangements may be made for more than one insertion head to work on a radiator core at any one time, and suitable sensors can be used to control the sequencing of the operation.

The apparatus described here makes it possible to alternate the insertion of U-shaped or hair pin heat exchanger tubes in a heat exchanger such as for example a car radiator or heater core.

I claim:

1. Apparatus for inserting U-shaped heat exchanger tubes in a heat exchanger core, the apparatus comprising a track which includes a pair of parallel channels for receiving the limbs of the tubes and for guiding the limbs on three sides, a slide for pushing the tubes along the track and into a heat exchanger core, and restraining means for closing the fourth side of the channels to guide the limbs, the restraining means being adapted to move out of the track as the head of the tube and the slide pass along the track.

2. Apparatus as claimed in claim 1, wherein one wall of each of the channels is formed, in use, by the surface of a tube waiting to be inserted.

3. Apparatus as claimed in claim 1, wherein the restraining means comprises at least one tongue which can be inserted into the track between the channels to locally close the fourth side of the channels.

4. Apparatus as claimed in claim 3, wherein the restraining means comprises three tongues.

5. Apparatus as claimed in claim 4, wherein the restraining means is arranged so that the tongues move out of the track sequentially as the tube moves along the track.

6. Apparatus as claimed in claim 4, wherein each tongue comprises a leading end part which is introduced into the track, and a rear end part which is engaged by a retractor mechanism.

7. Apparatus as claimed in claim 6, wherein each tongue is biased by a spring into its position in the track, and is moved out of the track, against the biasing force, by the retractor mechanism.

8. Apparatus as claimed in claim 7, wherein the retractor mechanism is a rod connected to the top of the slide which makes contact with each tongue a short distance ahead of the instantaneous position of the slide, to withdraw each tongue from the track.

9. Apparatus as claimed in claim 1, further including a magazine in which tubes are collected, and means for feeding a tube from the magazine into the track as soon as a preceding tube has been pushed out of the track.

10. Apparatus as claimed in claim 1, further including means for supporting a heat exchanger core in a fixed position relative to the track, and means for indexing the core and the track relative to one another so that the tubes can be inserted at different positions along the length of the core.

11. Apparatus as claimed in claim 10 further including a plurality of tracks arranged to insert tubes simultaneously into the same heat exchanger core.

* * * * *